United States Patent Office 2,884,468
Patented Apr. 28, 1959

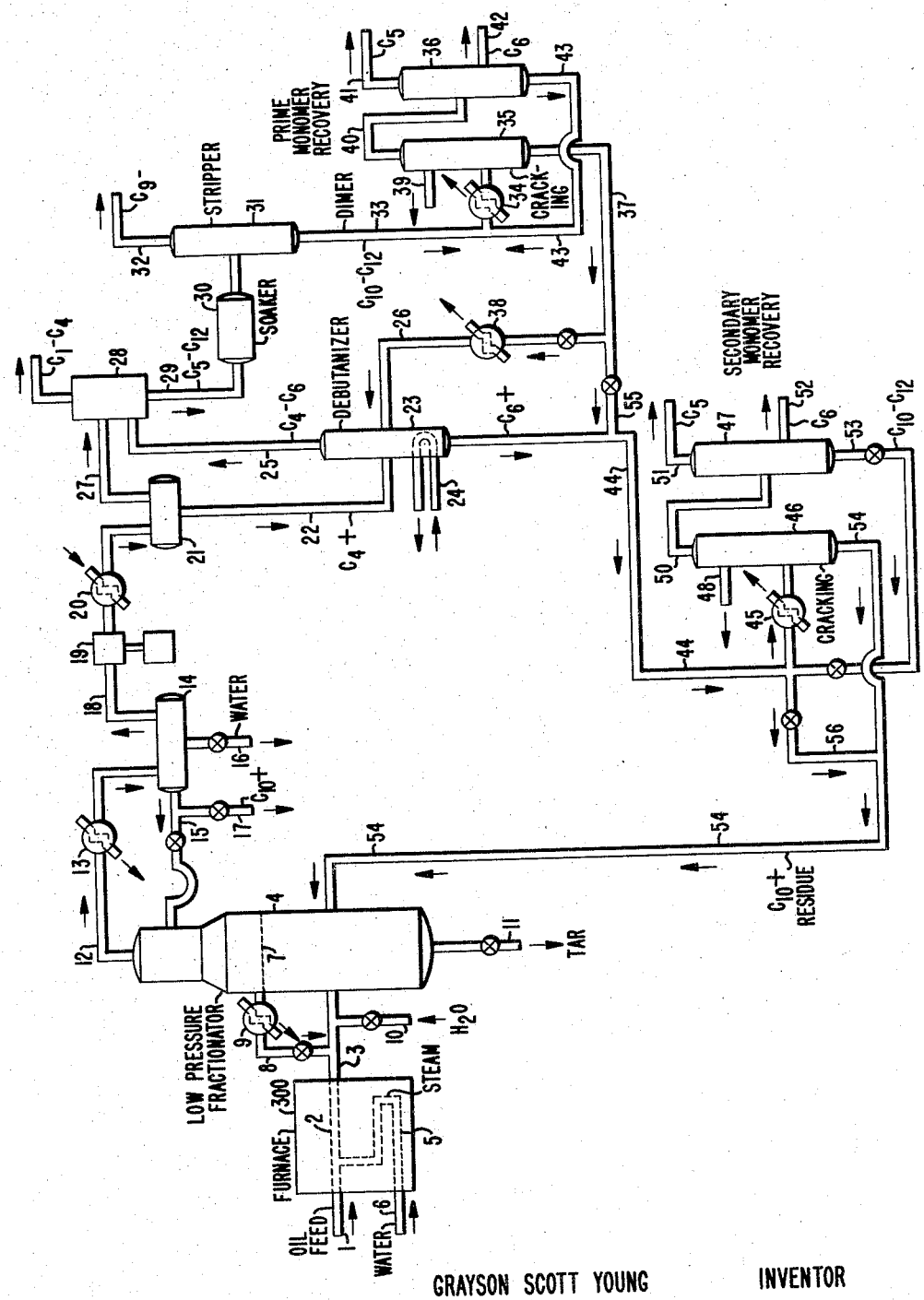

2,884,468

PROCESS OF PRODUCING CYCLODIENE MONOMERS FROM POLYMER-CONTAINING STREAMS

Grayson Scott Young, Baton Rouge, La., assignor to Esso Research and Engineering Company, a corporation of Delaware Application March 9, 1955, Serial No. 493,110

3 Claims. (Cl. 260—666)

This invention relates to treatments of streams containing polymers and copolymers of cyclodienes to obtain an improved overall recovery of cyclopentadiene monomer.

The importance of segregating streams containing the cyclodienes and collecting segregated cyclodienes as dimers from the many types of streams obtained in a high temperature vapor phase cracking process is shown in the U.S. Patents 2,636,055 and 2,636,056 of T. G. Jones. In processes, as shown by these patents, complications arose in recovering the cyclodiene monomers from the polymers higher than the dimers, with a tendency of the cyclodienes to become polymerized and copolymerized to the higher polymers in the heat treatments of the various streams. The higher polymers and copolymers are not only difficult to crack, but on being cracked in the presence of dimers, tend to contaminate the monomer products. Some of the copolymers are formed from acyclic as well as cyclic dienes.

An object of the present invention is to provide an improved method for treating certain streams which contain the refractory polymers and copolymers of cyclodienes in a manner which returns the cyclodiene monomers to streams that are further processed to give high purity monomer products with minimum difficulties of contaminating the products, disposing of tarry residues in cracking of such higher polymers and copolymers.

The principal features of the present invention will be described for the sake of clarity with reference to the drawing which shows a desirable flow plan in a schematic manner. To simplify the drawing some of the units of apparatus are not shown or are indicated to be consolidated with other units.

The general manner of carrying out the high temperature vapor-phase cracking to produce streams containing cyclodienes in monomer, dimer, higher polymer, and copolymer forms are shown in the patents of Jones, referred to above.

As illustrated in the flow plan of the drawing, a charging stock of vaporized gas oil, kerosene, or naphtha hydrocarbons, is passed from feed line 1 through high temperature heating tube 2 and a furnace 300. The resulting cracked product effluent is discharged from the cracking tube 2 through transfer line 3 into an intermediate or lower part of a low pressure fractionator 4.

The hydrocarbon charging stock, such as boils in the range of 250° F. to 700° F. passing through the heating tube 2 becomes heated to high cracking temperatures in the range of 1000° to 1500° F. for a short cracking period of about 1 to 5 seconds. Sufficient steam is added from steam coil 5 to the hydrocarbons passing through coil 2 to make the steam about 50 to 90 mole percent based on the hydrocarbon feed. A total pressure of from about 1 to 10 atm. is maintained in the cracking tube 2. The cracked product effluent is discharged from the cracking tube 2 into the transfer line 3 at temperatures in the range of about 1000° to 1500° F. under relatively low pressure of the order of 10 to 15 p.s.i.g. In the transfer line 3 the cracked product effluent stream is quickly quenched to lower its temperature to between about 550° F. and 650° F. and is then discharged into a mid-section of the low-pressure fractionator 4.

In the low pressure fractionator 4, also known as the primary fractionator, the cracked products are separated mainly into an overhead vapor distillate stream, a cycle gas-oil or cycle-oil condensate which collects on an intermediate plate 7 above the feed inlet from transfer line 3, and a bottoms tar fraction. All or a portion of the cycle or gas-oil may be withdrawn through line 8 and cooler 9 to be injected as a quench liquid into the transfer line 3. In addition, cool water may be introduced into the transfer line 3 for quenching from line 10. The heavier hydrocarbons forming the tar bottoms are withdrawn from a bottom part of fractionator 4 through line 11.

Inside the fractionator 4 as unvaporized portions of the feed materials with reflux condensates descend toward the bottom of the fractionating zone, these liquids become heated to temperatures in the range of 350° F. up to about 650° F. under low pressures of from about 0 to 15 p.s.i.g. The vapors reaching the top of the fractionating zone are withdrawn overhead from the fractionator 4 through line 12. By maintaining temperatures of the order of 300° to 350° F. in the upper part of fractionator 4, the overhead gas-vapor stream will normally contain the gaseous and volatile $C_1$ to $C_{15}$ hydrocarbons with gaseous hydrogen formed in the cracking and a large proportion of steam. The vapor removal can be carried out very rapidly so that under these conditions large proportions of the cyclopentadiene and methyl cyclopentadiene present are kept in the form of monomers, leaving hardly any appreciable amount of dimer in the liquid portions of the cracked products which collect as bottoms of the fractionating zone in tower 4.

The overhead gas-vapor stream from the primary fractionator 4 is passed by line 12 through cooling condenser 13, where the stream is cooled rapidly to lower temperatures between about 80° F. and 135° F. At these lower temperatures the heavy ends mainly $C_{10}+$ or $C_{12}+$ hydrocarbons together with a large part of the steam condense without giving much opportunity for cyclodiene components to undergo dimerization; the resulting condensates are collected as liquid phases in the receiver 14. A portion of the hydrocarbon liquid condensate collected in receiver 14 may be refluxed by line 15 to the upper part of fractionator 4 to add in controlling temperatures therein. Remaining aqueous and hydrocarbon condensates can be drained from receiver 14 through lines 16 and 17.

The gas-vapor stream which remains uncondensed and separated from the condensate caught in the receiver 14 is passed by line 18 through a compressor 19 and cooler 20 to a knockout drum 21. A number of such compressing and cooling means may be used to compress and cool the vapor stream quickly to temperatures in the range of 90° to 135° F. under pressures of the order of 40 to 210 p.s.i.g. so that nearly all the water vapors condense with most of the $C_6+$ hydrocarbons without giving the $C_5$ and $C_6$ cyclodiene monomers opportunity to undergo substantial dimerization or polymerization. The number and size of the compressor, cooling and knockout drum apparatus depends on required capacity and desired sharpness of separation. For simplification, a single series of such means is illustrated.

The liquid separated and collected in the knockout drum 21 is a complex mixture of cyclodiene monomers with other hydrocarbons mainly in the $C_5$ to $C_{15}$ range. This mixture is passed through line 22 into a fractionating zone termed a debutanizer 23 since it has the function of separating as volatile overhead products as much $C_4$ to $C_6$ hydrocarbons as possible rapidly and without overheating so as to avoid copolymerization and higher polymerization. This is a very sensitive unit and requires special control conditions. For simplification a single debutanizer unit is shown but it is possible to use a series of small fractionating column as debutanizers at this point for stripping out $C_4$ to $C_6$ components as much as possible with the least amount of degradation to higher polymers and copolymers. For good control of the debutanizer zone in apparatus 23 a heating or reboiling means 24 is provided for heating the bottoms fraction thereof to give bottoms temperatures of the order of 280° to 350° F. and under pressures of 80 to 180 p.s.i.g. Under these pressures the debutanizer reboiler 24 provides a zone ranging in temperature from about 400° to 650° F. in which a small amount of cracking can be obtained of dimers and higher polymers to free the $C_5$ and $C_6$ cyclodiene monomers which are advantageously removed in the overhead stream from the tower 23 through line 25 so that these monomers can be segregated to finally yield a high purity cyclopentadiene monomer product. The dimer and higher polymer stream listed for injection into the debutanizer tower 23 is passed thereto from line 26. The method of obtaining this stream will be described later.

The $C_4$ to $C_6$ overhead gas-vapor mixture from the debutanizer 23 and the uncondensed gas-vapor mixture withdrawn from the knockout drum 21 through line 27 are passed to purification and fractionating means designated by the unit or system 28. This purification and fractionating means or system may include means for desulfurizing the gases and vapors, e.g. a caustic scrubber, a dehydrating means for removing water, such as employs adsorptive alumina, and various fractionating means for separating $C_1$ through $C_4$ hydrocarbon components as well as other gaseous materials, leaving as a liquid condensate product a fraction which includes $C_5$ cyclopentadiene monomer and dimer as well as other hydrocarbons in the $C_5$ to approximately the $C_{12}$ range. The $C_5$ to $C_{12}$ range fraction is passed from the unit 28 through line 29, thence through a thermal soaker 30 into a stripper or fractionator 31.

In the thermal soaker 30 the $C_5$ to $C_{12}$ fraction is heated under sufficient pressure to keep the hydrocarbon liquid at temperatures of 150° to 250° F. for a sufficient period, e.g. 2 to 24 hours to bring about dimerization of the cyclodienes selectively. In general, it is desired to have the cyclodienes selectively dimerized without forming copolymers with acylic dienes present, such as the isoprene, piperylene, hexadienes, etc.

In the stripper or fractionator 31, the undimerized materials are distilled overhead to leave a bottoms fraction of mainly a $C_{10}$ to $C_{12}$ cyclopentadiene and methylcyclopentadiene dimers. This dimer bottoms fraction may be made to contain close to 95% cyclopentadiene monomer in the form of dimer. By using temperatures in the range of 265° to 290° F. and pressures in the range of 5 to 12 p.s.i.g. in column 31, a good separation of $C_9$ and lower boiling ($C_9-$) hydrocarbons is effected from the $C_{10}$ to $C_{12}$ dimer bottoms fraction. The volatilized components are removed overhead from tower 31 to outlet line 32. The cyclodiene dimer bottoms is passed through line 33 to a dimer cracking and primary monomer recovery unit represented by a heater 34 and a series of fractionating columns 35 and 36.

Various types of dimer cracking units may be used including cracking the dimer in vapor phase or in liquid phase. The cracking operation is employed mainly as a method of further purifying and concentrating the cyclodiene monomers which are to be recovered. The dimer concentrate is heated, as in heating unit 34, to temperatures at the range of 400° F. to 650° F. to decompose the dimer into monomer. A fractionating means 35 separates the monomers overhead from uncracked dimers and also from the polymers and copolymers which tend to be formed during the cracking. The residual liquid mixture of uncracked dimers, polymers and copolymers separated as a heavy fraction in the fractionating means 35 is withdrawn to be passed through line 37, heat exchanger 38 and line 26 to debutanizer 23 where a further recovery of cyclopentadiene monomer can be advantageously effected.

In conjunction with the fractionating means 35 and 36 provisions may be made for withdrawing an intermediate $C_7$ to $C_9$ fraction as through line 39 since such a fraction gives difficulty if it is returned to the system where high purity cyclopentadiene monomer is being separated. The overhead mixture from fractionator 35 passed by line 40 into fractionator 36 will tend to contain $C_6$ cyclodiene, methylcyclopentadiene, with the cyclopentadiene. A separation between these monomers is effected in the fractionating zone 36 which is controlled at temperatures in the range of 100° to 150° F. and pressures in the range of 0 to 5 p.s.i.g. to permit the cyclopentadiene monomer to be taken overhead through line 41. The $C_6$ cyclodiene can be removed as a fraction through line 42. During the fractionation it is difficult to avoid a substantial amount of redimerization. The resulting dimers and codimers from the redimerization in fractionator 36 can be recycled through line 43 for recracking.

In recovering the cyclopentadiene and methyl cyclopentadiene of highest or prime quality from various cracked hydrocarbon streams, it is advantageous to increase the recovery by using a separate dimer cracking unit on materials such as from the bottoms in debutanizer 23. Such materials include principally $C_{10}+$ hydrocarbon components with the high content of polymers and copolymers higher than the dimers and codimers of the $C_5$ and $C_6$ cyclodienes. This bottoms material is withdrawn from the debutanizer or fractionating means 23 through line 44 to the secondary cracking unit which may include a heating means 45 and fractionating means 46 and 47. This type of unit is operated much the same as the primary cracking unit which has been described except that it is controlled to suit the more refractory polymer and copolymer feed. The heater 45 is operated to supply sufficient heat for the cracking of dimers, codimers, and to some extent the polymers and copolymers at temperatures in the range of 400° to 650° F. An intermediate fraction of $C_7$ to $C_9$ components may be withdrawn from the first fractionator 46 through line 48 to avoid build-up, particularly of polymers and copolymers of $C_7$ cyclodienes. The overhead from fractionator 46 is passed through line 50 into fractionator 47 for separating a light fraction overhead of cyclopentadiene through line 51 and a higher boiling $C_6$ fraction which is withdrawn through line 52.

A $C_{10}$–$C_{12}$ dimer bottoms may be recycled through line 53 for recracking. However, a high boiling polymer and copolymer residue which is separated from the monomer vapor fraction in a fractionating means 46 still has available a substantial amount of cyclopentadiene and methyl cyclopentadiene some of which is in the form of dimer and codimer, but most of which is in the form of higher polymers and copolymers ($C_{10}+$). This particular material is advantageously passed through line 54 to be introduced into a suitable part of the fractionating zone in the low pressure fractionator 4.

It has been found desirable to introduce the polymer and copolymer mixture from line 54 into fractionator 4 below the plate on which the cycle gas oil is collected and somewhere in the region where the quenched high-temperature cracked products from transfer line 3 enter the primary factionator 4 in order to have suitable conditions for cracking to recover additional $C_5$ and $C_6$ cyclodiene monomer. In this appropriate region of introducing the polymer and copolymer stream from line 54 into fractionator 4 the temperatures are in the range of 550° to 650° F., the pressures are in the range of 5 to 20 p.s.i.g.

and the time of residence is extremely short, less than 60 seconds and preferably of the order of 5 to 10 seconds. The high volume of gaseous and vaporous materials flowing up through the fractionator 4 aids in diminishing polymerization and copolymerization which would otherwise destroy the benefits of passing the stream from line 54 into the fractionator 4.

With the advantageous manner of circulating the various streams that have been disclosed, there are some modifications and alternatives which may be employed beneficially. For example, if it is desired a portion or all of the stream withdrawn from the primary cracker through line 37 can be passed directly to the feed line of the secondary cracking unit through a bypass 55, and if it is desired all, or a portion of such materials as flow through line 44 to the secondary fractionator cracking unit, can be bypassed therefrom through line 56 into the line 54 to be carried directly to the primary fractionator 4. It will be appreciated that these modifications are useful to relieve loading on those parts of the unit which are ont dependent on the changes that are bound to occur with fluctuations in the amounts of the various streams.

Operations which demonstrated advantages of the present invention will be described in the following example:

*Example*

Using conventional procedure in which higher polymer concentrates of the cyclodienes are not returned to a primary fractionator from which monomer streams are initially withdrawn, it was found that there is a limit in the recovery of the cyclopentadiene due to the loss of the cyclopentadiene in purge streams of the higher polymer. Efforts were made to overcome the losses of the cyclodienes in the higher polymer purge streams by sending such streams to the cracking tube 2 and transfer line 3, but this kind of operation was unsatisfactory in that the polymer streams caused excessive coke formation at elevated temperatures in these parts of the system.

Studies then showed the temperature and pressure conditions present in the low pressure primary factionator 4 between approximately the transfer line inlet and the tar bottoms section are best suited for reconverting trimers, higher polymers and copolymers of the cyclodienes to monomers without handling difficulties which would occur in other parts of the system.

It was noted that the higher polymer concentrate feed from line 54 into the low pressure fractionator generally amounts to about 2%, or 1 to 5% by weight of the total hydrocarbon feed into tower 4. Yet, from this small amount of reconverted polymer an extremely high increase in recovery is obtainable, e.g. about 20% more cyclopentadiene monomer product and corresponding high increases in recovery of methyl cyclopentadiene and isoprene are to be expected.

Test data on conditions present in the primary fractionator 4 show that if the polymer and copolymer streams, such as bottoms from the debutanizer 23, are passed into upper zones of the primary fractionator 4 where the temperatures are lower than 550° F. unsatisfactory cracking is obtained. The best cracking temperatures for these materials are shown to be in the range of 550° to 650° F. Cracking of these materials at substantially above 650° F. particularly at ordinary cracking temperatures which are above 900° F., causes excessive degradation and fouling by coke deposits.

The object to be achieved with the present invention is to increase the yield of high purity (95% and higher) cyclopentadiene monomer, principally by converting the higher polymer and copolymers to monomers where the monomers can be directed back to a primary dimer cracking and cyclodiene monomer recovery unit.

The invention described is claimed as follows:

1. In a process for segregating high purity cyclopentadiene from hydrocarbons cracked in the presence of steam, wherein the cracked hydrocarbon-steam mixture is quenched to a temperature in the range of 550° F. to 650° F. and discharged into a midsection of a low-pressure fractionating zone, the improvement which comprises collecting from overhead distillates of said zone a fraction having a high content of polymers and copolymers formed from diolefins having 5 to 7 carbon atoms, stripping from said fraction $C_5$ and $C_6$ cyclodiene monomers, passing a residual portion of said polymers and copolymers into a heating zone where dimers of said diolefins are cracked into monomers, removing said monomers formed by cracking from the residual portion of the polymers and copolymers, then passing the remaining residue of the polymers and copolymers into said low-pressure primary zone where said polymers and copolymers contact an entering stream of the cracked hydrocarbon-steam mixture at temperatures in the range of 550° F. to 650° F. and at pressures in the range of 5 to 15 p.s.i.g. to convert a substantial amount of said polymers and copolymers into monomers, and withdrawing remaining portions of the polymers and copolymers with tars of the freshly cracked hydrocarbons from the low-pressure fractionating zone.

2. In a process of segregating high purity cyclopentadiene from hydrocarbon vapor-phase cracked at 1000° to 1500° F. in the presence of steam, wherein a resulting freshly cracked hydrocarbon and steam mixture is quenched and charged into a midsection of a low-pressure fractionating zone from which cyclopentadiene is distilled overhead with steam and hydrocarbons in the $C_1$ to $C_{15}$ range, the improvement which comprises fractionating overhead distillate from said fractionating zone to separate hydrocarbons in the $C_5$ to $C_{12}$ range from water condensate and from lower boiling hydrocarbons, collecting from the separated hydrocarbons in the $C_5$ to $C_{12}$ range a concentrate of cyclopentadiene dimer and a residual fraction having a high content of polymers and copolymers of cyclopentadiene higher boiling than the dimer of cyclopentadine in a zone where cyclopentadiene monomer is stripped therefrom, forming more of said polymers and copolymers by cracking said concentrate of cyclopentadiene dimer in a dimer cracking zone, passing at least a portion of said polymers and copolymers into the low-pressure fractionating zone for contact therein with the quenched freshly cracked hydrocarbon-steam mixture at temperatures in the range of 550° to 650° F. and pressures in the range of 5 to 15 p.s.i.g. to convert a substantial amount of the polymers and copolymers into cyclopentadiene monomer which is distilled overhead from the low-pressure fractionating zone, and withdrawing residual portions of the polymers and copolymers with tars of the freshly cracked hydrocarbons from the low-pressure fractionating zone.

3. In a process of segregating cyclopentadiene and methylcyclopentadiene monomers from hydrocarbons cracked in the vapor phase in the presence of about 50 to 90 mole % steam, the improvement which comprises collecting a residual hydrocarbon fraction having high contents of dimers with higher boiling polymers and copolymers of $C_5$ and $C_6$ cyclodienes in a zone where monomers of said cyclodienes are stripped from said residual fraction, cracking said residual fraction dimers in a heating zone at 400° to 650° F. to form more of the monomers and higher boiling polymers and copolymers collected in the residual fraction, passing said residual fraction containing the cyclodiene polymers and copolymers higher boiling than said dimers into a low-pressure fractionating zone which receives a mixture of freshly cracked hydrocarbons and steam from a cracking zone wherein hydrocarbons are cracked in the vapor phase at 1000° to 1500° F. with about 50 to 90 mole percent steam, said residual fraction of polymers and copolymers of the cyclodienes being introduced into said low pressure fractionating zone in a proportion of 1 to 5% by weight of the freshly cracked hydrocarbons entering said zone, maintaining in said low-pressure fractionating zone temperatures in the range of 550° to 650° F. and pressures in the range of 5 to 15 p.s.i.g. so that the said polymers and copolymers undergo substantial cracking, withdrawing overhead from the low pressure fractionating zone steam with hydrocarbons in the $C_1$ to $C_{15}$ range including monomers and dimers resulting from the cracking of said polymers and copolymers, and withdrawing residual portions of the polymers and copolymers from the low pressure fractionating zone with tars of the freshly cracked hydrocarbons.

References Cited in the file of this patent
UNITED STATES PATENTS

| | | |
|---|---|---|
| 2,511,936 | Morrell et al. | June 20, 1950 |
| 2,636,056 | Jones | Apr. 21, 1953 |
| 2,733,280 | Hamner | Jan. 31, 1956 |